United States Patent [19]

Shichman et al.

[11] 4,427,473
[45] Jan. 24, 1984

[54] BELT FOLDING MACHINE AND METHOD

[75] Inventors: Daniel Shichman, Stow; George E. Enders, Salem, both of Ohio

[73] Assignee: NRM Corporation, Akron, Ohio

[21] Appl. No.: 428,294

[22] Filed: Sep. 29, 1982

Related U.S. Application Data

[63] Continuation of Ser. No. 14,132, Feb. 22, 1979, abandoned.

[51] Int. Cl.$^3$ ............................................. B29H 17/16
[52] U.S. Cl. .................................... 156/130; 156/401; 156/414; 156/421.4
[58] Field of Search ............ 156/123, 126, 127, 128.1, 156/129, 130, 130.3, 132, 394.1, 414–420, 421.4, 156/443, 401

[56] References Cited

U.S. PATENT DOCUMENTS

| | | | |
|---|---|---|---|
| 2,980,160 | 4/1961 | Deibel | 156/415 |
| 3,154,455 | 10/1964 | Nebout | 156/443 |
| 3,160,545 | 12/1964 | Burton | 156/415 |
| 3,346,434 | 10/1967 | Fulton | 156/415 |
| 3,438,832 | 4/1969 | Cantarutti | 156/132 |
| 3,525,655 | 8/1970 | Wood et al. | 156/126 |
| 3,647,598 | 3/1972 | Gazuit | 156/415 |
| 3,740,293 | 6/1973 | Jones et al. | 156/127 |
| 3,784,437 | 1/1974 | Appleby et al. | 156/401 |
| 3,831,657 | 8/1974 | Dillenscheider | 152/361 FP |
| 4,063,987 | 12/1977 | Irie | 152/361 R |
| 4,087,306 | 5/1978 | Head et al. | 156/132 |
| 4,128,450 | 12/1978 | Cantarutti | 156/417 |
| 4,249,979 | 2/1981 | Burley | 156/412 |

*Primary Examiner*—Edward C. Kimlin
*Assistant Examiner*—F. K. Wine
*Attorney, Agent, or Firm*—Maky, Renner, Otto & Boisselle

[57] ABSTRACT

A belt, band or other tire component folding machine and method are characterized by a rotatable and expandable drum comprising a substantially rigid cylindrical deck having a precisely formed peripheral deck edge and an inflatable bladder assembly positioned slightly axially and radially inwardly subjacent the deck edge which cooperate to define a precise fold line along the deck edge at which a ply or belt band or the like is precisely and sharply folded. Preferably, dual inflatable bladders are employed at each end of the deck, one bladder being contiguous to the other and arranged on inflation to walk up the precisely formed and contoured deck edge to turn up the overhanging band end, and the other arranged to push the first bladder axially inwardly to complete the fold of the band flat upon itself. A preferred form of deck comprises a plurality of readily replaceable segments which are mounted in a self-aligning manner on a radially expandable and rotatable hub. Each segment includes a pair of interfitting outer deck sections which are movable axially of the drum towards and away from each other to expand and contract the width of the deck in precise increments. Various forms of the deck further comprise spring gap shields or elastic gap spanning bands which circumscribe the deck at the deck edges. The various components are readily interchangeable with components of different sizes and adjustable to accommodate different sizes of tire components.

60 Claims, 14 Drawing Figures

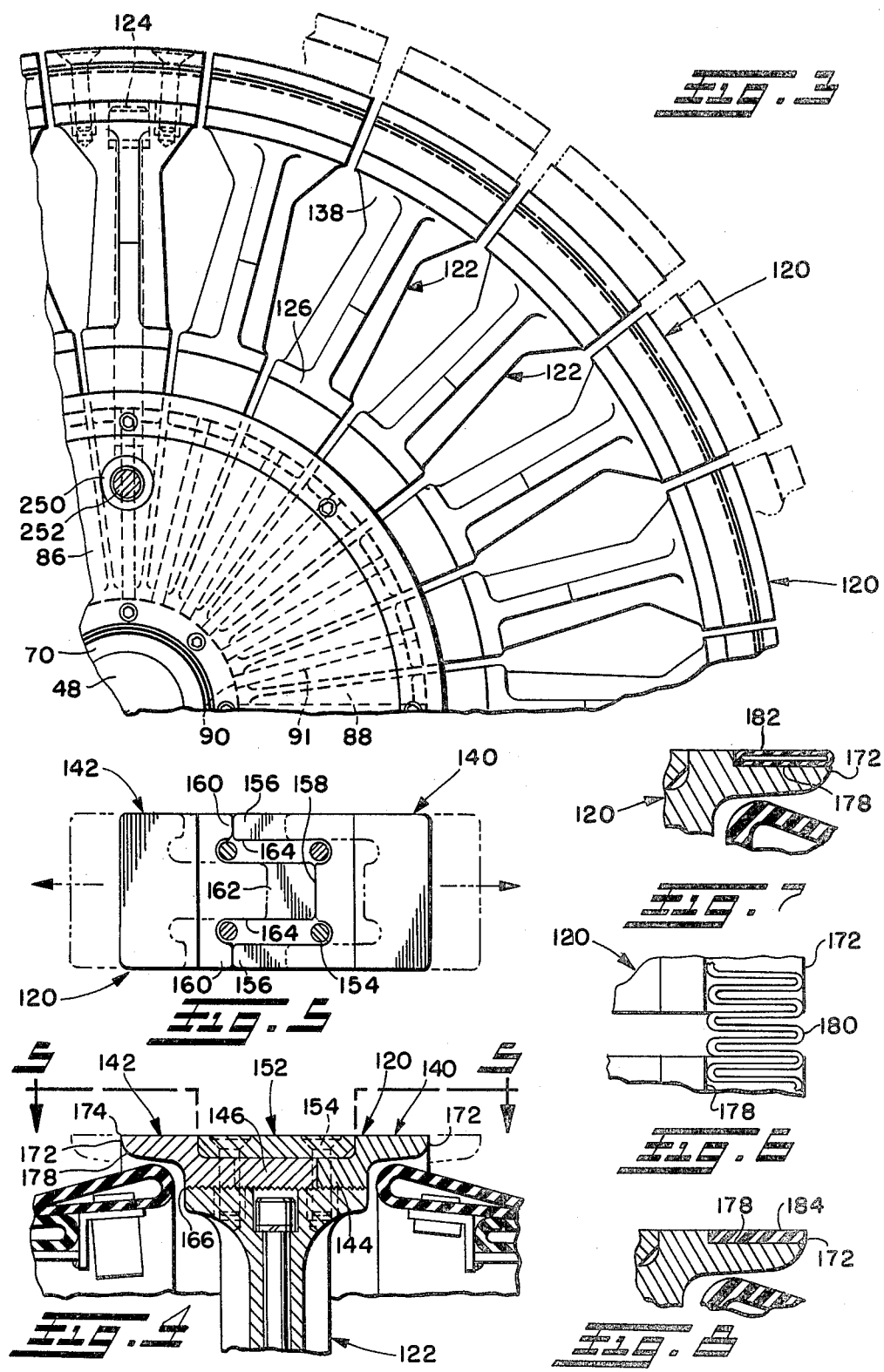

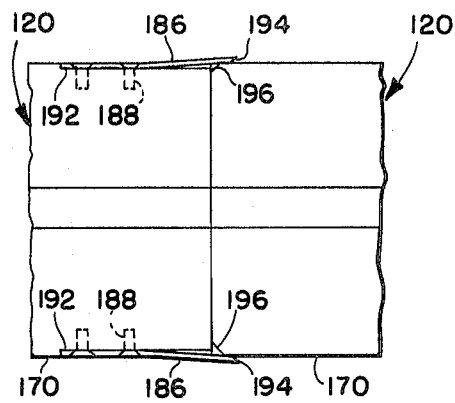
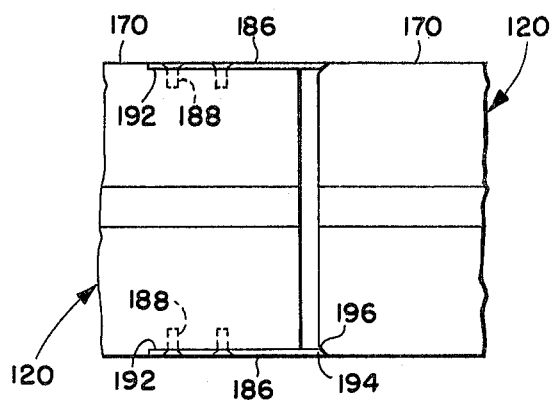
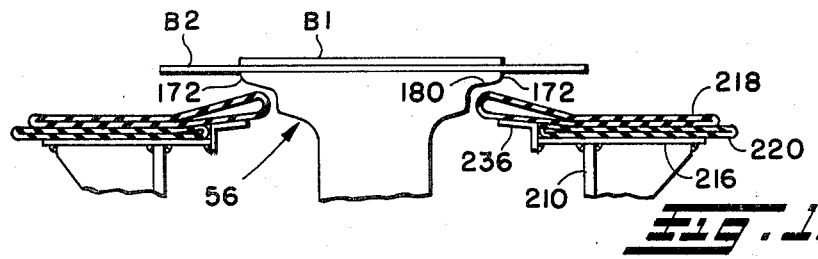
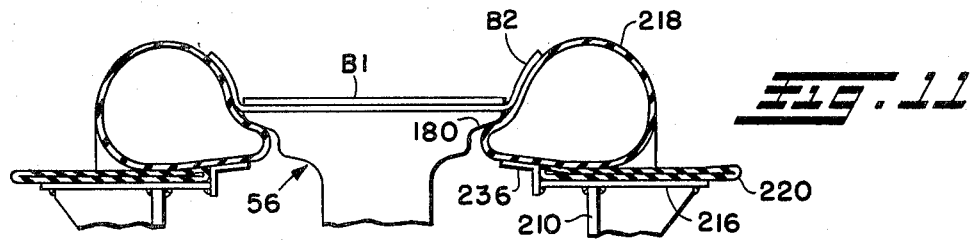
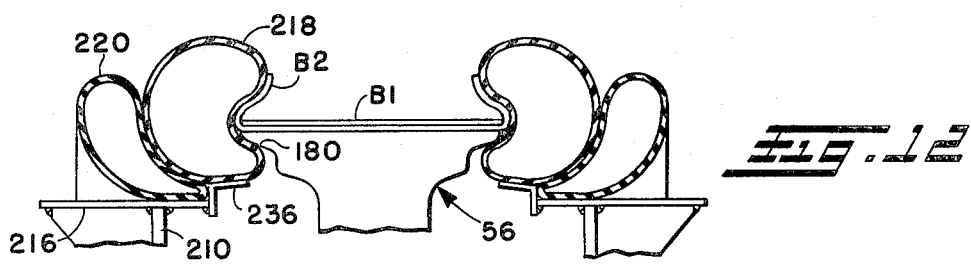
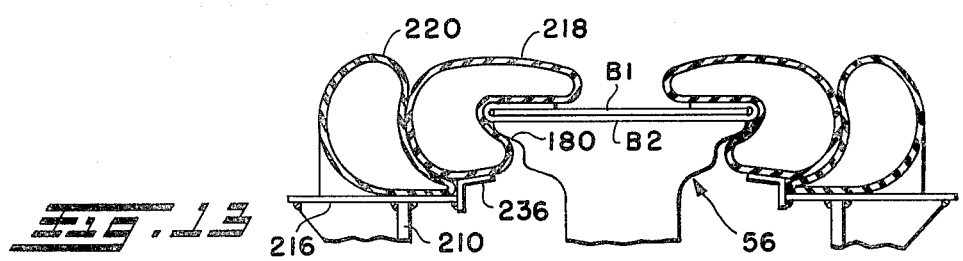

BELT FOLDING MACHINE AND METHOD

This application is a continuation of application Ser. No. 014,132, filed Feb. 22, 1979, now abandoned.

FIELD OF THE INVENTION

This invention relates generally to a tire building machine and more particularly to a belt or other tire component folding machine having provision for sharply folding tire components along precise fold lines, and a method for folding such components.

BACKGROUND OF THE INVENTION

In the manufacture of belted tires and more particularly radial tires, it has been found desirable that the breaker or ply belts or the like serving as reinforcement members of tires be constructed with folded edges. This avoids sharp exposed edges. This may be done by folding the breakers or plies sharply on themselves or to wrap around the edge portions of the other contiguous breakers or plies. Hence, the formation of the desired folded edges requires turning the circumferential edge portions of the endless breaker or ply belts along a fold line so that the so turned portions overlie adjacent circumferential portions of the belts. For precision tire making, formation of sharp and precise folds is particularly important. For example, such precise and sharp folding of the belts eliminates the need for subsequent sizing and trimming of the folded belts.

Heretofore, inflatable bags or bladders have been employed in tire building and belt folding machines to fold the breaker or ply belts and to carry out various other turning operations during building of tire components. Reference may be had, for example, to applicants' assignee's U.S. Pat. No. 3,348,832, dated Apr. 15, 1969, which discloses a dual bladder construction in a tire building drum for turning a ply about a bead core to form a tire carcass. However, such machine is not designed to fold sharply a breaker or ply belt back upon itself. For examples of belt folding machines that employ inflatable bladders for folding a tire component belt back upon itself, reference may be had to the Nebout U.S. Pat. No. 3,154,455, dated Oct. 27, 1964, and Wood et al U.S. Pat. No. 3,525,655, dated Aug. 25, 1970. However, to obtain the desired folds, such machines employ rubber decks with vacuum hold downs to hold the belt to the drum and to attempt to define the fold line while the edge thereof is being folded. Unfortunately, such types of belt folding machines using rubber decks with the bladders as a continuation thereof cannot with ensured repeatability obtain a precise fold edge. Rubber is well known for its change in characteristics upon age and repeated use.

In some such prior art constructions employing inflatable bladders, the fold line may be defined solely by the configuration of the bladders. However, such construction may be undesirable because no precise unyielding fold line is provided to ensure a precise and sharp fold. Moreover, the expansion characteristics of the bladder may vary depending on ambient conditions or the condition of the bladder leading to undesirable fold dimensional variations from one cycle to the next. An exemplary belt folding machine of such prior art constructions is disclosed in Head et al U.S. Pat. No. 4,087,306, dated May 2, 1978.

Another known belt folding machine, disclosed in Irie et al U.S. Pat. No. 4,063,987, dated Dec. 20, 1977, employs complex indexed folding and wrapping devices for effecting the fold. However, such machine is somewhat complicated in construction and operation.

It is also known to provide tire building and belt folding machines which include radially expandable drum decks, and some such decks are also axially adjustable. For examples of such decks, reference may be had to the following U.S. patents: Burton U.S. Pat. No. 3,160,545, Appleby et al U.S. Pat. No. 3,784,437, Jones et al U.S. Pat. No. 3,740,293 and Gazuit U.S. Pat. No. 3,647,598.

SUMMARY OF THE INVENTION

In contradistinction to known tire building machines having provision for folding tire component belts, the belt folding machine and method according to this invention are characterized by a rotatable and expandable belt folding drum comprising a substantially rigid cylindrical deck having a precisely formed and contoured peripheral deck edge and an inflatable bladder or bag positioned slightly axially and radially inwardly of the deck edge which cooperate to effect a fold along a precise fold line formed by the deck edge, at which an endless breaker or ply belt or the like may thus be sharply and precisely folded. The deck edge is defined by a thin end face which forms a sharp shoulder with the adjacent cylindrical work surface of the drum and which is convexly contoured at its radially inner portion to form a gradually curving continuation of the underside of the deck adjacent the deck edge.

Preferably, dual inflatable bladders are employed at each end of the deck, one bladder being contiguous to the other and arranged on inflation to walk up the contoured underside of the end face of the deck to turn up the overhanging component precisely at the deck edge, and the other arranged on inflation to push the first bladder axially inwardly to fold the same, and thus the component end, around the fold defined by the deck edge to form a sharp and precise fold in the component. The dual bladders may be supported on a cylindrical support and are readily interchangeable as a unit in the belt folding machine as required.

A preferred form of belt folding drum comprises a plurality of deck segments which together define a substantially rigid, cylindrical work surface and which are mounted on a radially expandable and rotatable hub by uniquely shaped inner deck supports, such deck supports providing sufficient radial and axial support for the deck segments while permitting clearance for and access to the various drum components. Such deck segments must be well supported as the bladders when expanded exert substantial axial and radial forces thereagainst.

Each deck segment includes a pair of outer deck sections having interfitting portions which are movable towards and away from each other in precise increments to expand and contract the deck axially. The deck sections are adjustably clamped to their respective deck supports by a center deck section radially coextensive with the interfitting portions of the outer deck sections. In one form of the invention the deck may also include a continuous elastic band which circumscribes the deck segments at the deck edge with the end face of the band flush with the deck end face and having a sharply formed shoulder defining the fold line. Accordingly, a belt folding machine having an axially and radially expandable and contractible deck is provided while still presenting a substantially rigid work surface and having essentially a continuous peripheral edge. Although belts have been successfully folded with significant gaps in the deck edge, spring gap shields at the deck edge may be provided.

Also, importantly, the invention contemplates components which may be readily assembled on existing shafting in belt building machines whereby the latter may be retrofitted. The major components may also readily be disassembled for substitution of components of other size to build different diameter ranges of belts or bands.

Other features of the present invention will become apparent as the following description proceeds.

To the accomplishment of the foregoing and related ends, the invention, then, comprises the features hereinaftr fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 3 is a fragmentary radial section of the belt folding drum of FIG. 2, taken along the line 3—3 thereof;

FIG. 4 is an enlarged fragmentary section of the belt folding drum of FIG. 2 illustrating in greater detail the expandable and contractible deck construction;

FIG. 5 is a plan view of a deck segment of the drum of FIG. 4, as seen substantially from the line 5—5 thereof;

FIGS. 6-8 are, respectively, section, plan and section views of modified deck constructions illustrating continuous edge forming bands;

FIGS. 9A and 9B are fragmentary plan views looking radially inwardly at the drum deck illustrating edge gap shields with the drum contracted and expanded, respectively; and FIGS. 10-13 are fragmentary schematic radial sections illustrating the operation of the tire building drum according to the method of the invention for folding the circumferential end portions of a tire component belt, and more particularly:

FIG. 10 shows the tire component belt and the inflatable bladders of the belt folding drum in a deflated state with the components on the expanded drum and ready for folding;

FIG. 11 shows the turn-up bladder inflated to form a sharp fold in the tire component belt at the fold line defined by the edge of the deck;

FIG. 12 shows the pusher bladder partially inflated to push axially inwardly the turn-up bladder; and FIG. 13 shows both bladders expanded with the tire component belt edge being completely folded at a precise fold line defined by the edge of the deck.

DESCRIPTION OF THE PREFERRED EMBODIMENT

General Description of the Tire Building Machine

Figure 1:
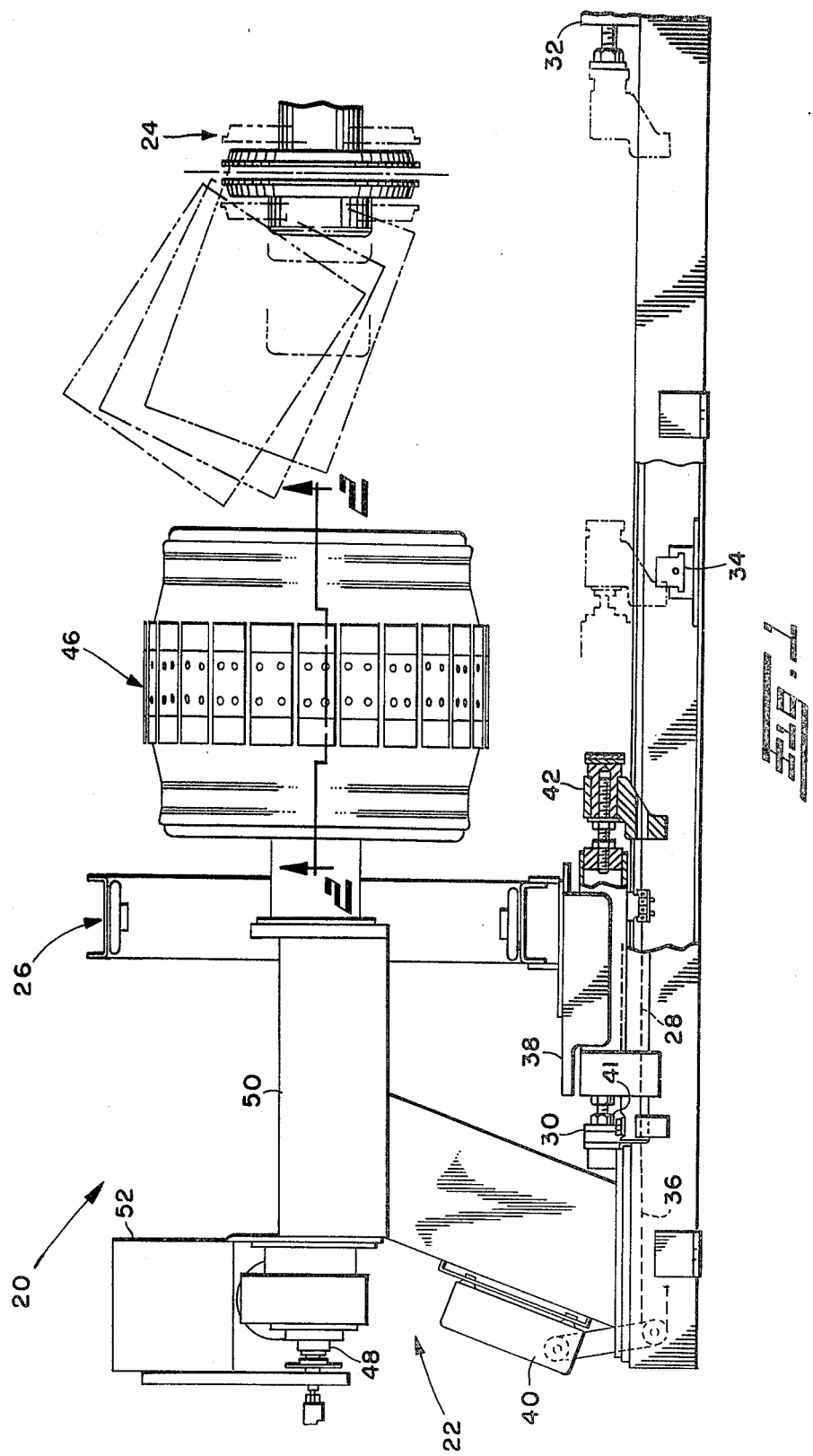
FIG. 1 is a fragmentary front elevation, partially broken away, of a tire building machine in accordance with the present invention.

Referring now in greater detail to the drawings and initially to FIG. 1, a tire building machine designed generally by reference numeral 20 comprises a belt and tread forming machine 22 and an in-line second stage or tire carcass shaping machine shown generally at 24. Generally, a belt and tread assembly is made at the machine 22 which is described below in greater detail, the breaker and ply belts generally being formed and folded and the tread subsequently applied to the folded belt. Then, the belt and tread assembly is transferred to the second stage machine 24 for application to a shaped carcass and subsequent stitching. It will be appreciated that the present invention may be employed with a wide variety of other tire building operations of both the single and second stage type.

To facilitate transfer of the fabricated belt and tread assembly from the machine 22 to the second stage machine 24, such machines have their axially extending centerlines aligned along a common axis of the tire building machine 20. A tire component carrier or transfer 26 may be employed to grip and engage the fabricated belt and tread assembly at the center line of the machine 22 and then transfer axially such assembly to the center line of the second stage machine. Rails or guides 28 extending parallel to each other and also parallel to the machine axis support the transfer 26 for such axial movement along the axis of the tire building machine 20. The transfer 26 is moved along the rails 28 between adjustable end stops 30 and 32 and disappearing intermediate stop 34 by means of a chain drive 36 which is received in center slotted housing 38 and is driven by chain drive motor 40. The center slotted housing 38 has suitable adjustable bumpers 41 and 42 which engage the various stops to control precisely the positioning of the transfer 26 relative to the transverse centers of the machines 22 and 24. The transfer in FIG. 1 is retracted to permit the various operations to be carried out by an operator at the machines.

Still referring to FIG. 1, the machine 22 comprises a belt folding drum 46 which is mounted on and rotatable with drive shaft 48. The drive shaft 48 projects in cantilever fashion from a stand or pedestal 50 and, along wth the drum 46, is driven for controlled rotation by drum drive 52. The drum 46 is of the type which expands to a set diameter and provides a substantially rigid, cylindrical working surface on which the belt and tread assembly is constructed. The belt or breaker plies which are wrapped around the expanded drum to form an endless band may be supplied from a shuttle servicer, not shown, also driven from the drive 52. After the tread and breaker assembly is constructed, the drum is collapsed to a reduced diameter to permit removal of such assembly by transfer 26.

Belt Folding Drum (46)

Figure 2:
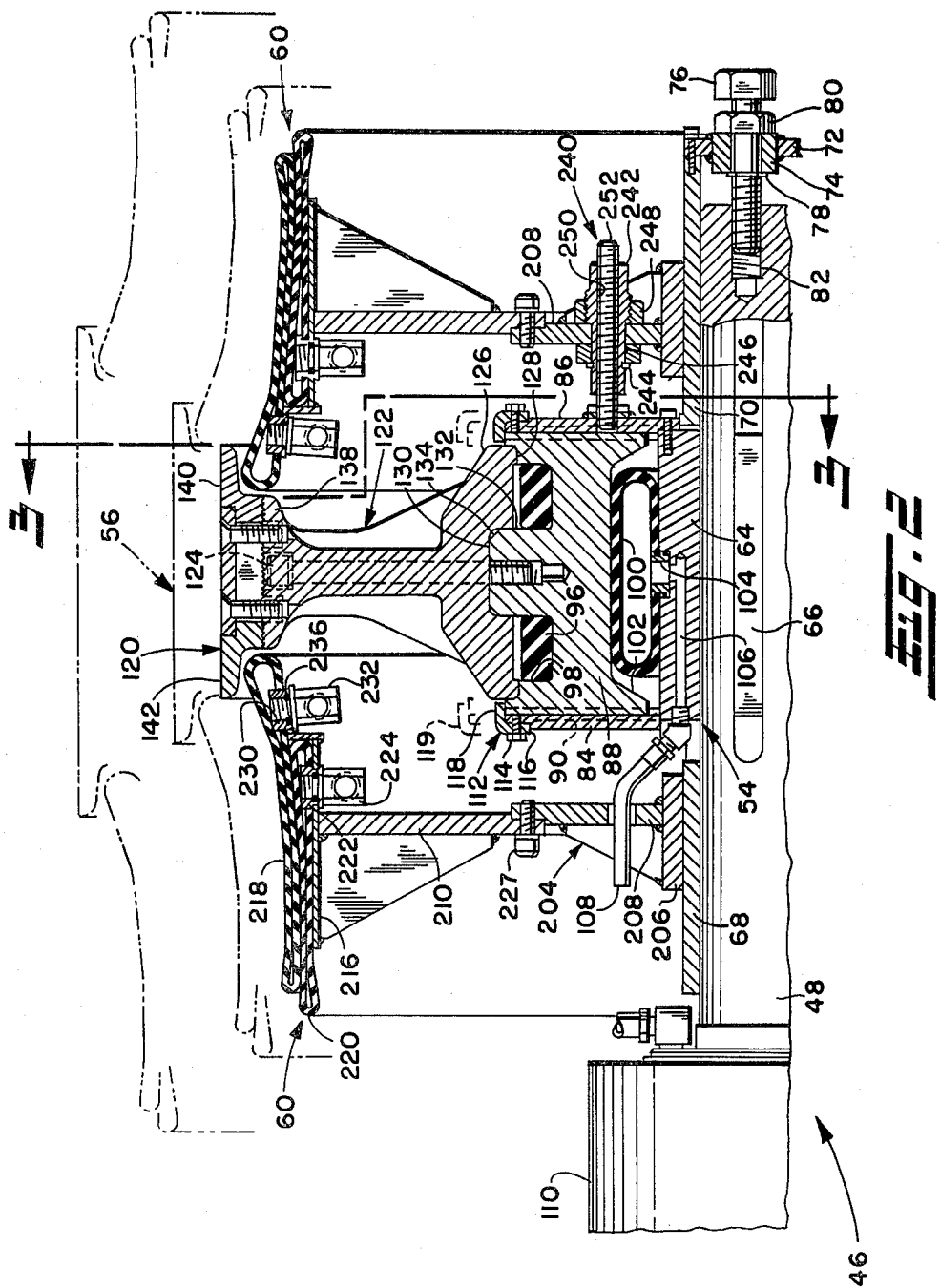
FIG. 2 is an enlarged fragmentary quarter section of the machine of FIG. 1, taken along the section line 2—2 thereof, illustrating the belt folding drum thereof.

Referring now additionally to FIGS. 2 and 3, it can be seen that the major components of the tire belt folding drum 46 are supported in sleeve-like fashion on the drive shaft 48 for axial sliding movement therealong to facilitate assembly and disassembly of the drum and to insure that the drum is assembled with proper symmetry and squareness with respect to the transverse center line as well as the axial center line of the machine 22. It will be appreciated that such construction provides for assembly of such components on existing shafting in existing machines whereby the latter may readily be retrofitted.

The drum 46 generally comprises rotating hub assembly 54 to which is secured an expandable central deck 56. Positioned at one or both ends of the deck 56 are dual bladder assemblies 60. The hub assembly 54, deck 56 and dual bladder assemblies 60 are described below in greater detail.

Rotating Hub Assembly 54

The rotating hub assembly 54 comprises a drum hub 64 which is keyed to the drive shaft 48 for rotation therewith by hub key 66. The drum hub 64 at its opposite axial ends is secured, respectively, to a follower hub guide or sleeve 68 ad an adjustable hub guide or sleeve 70. Such hub guides 68 and 70 ride or slide on the exterior of the drive shaft 48 and are axially adjustable with the hub 64 as a unit. To effect such adjustment, the adjustable hub guide 70 has its axially outer end projecting beyond the end of the shaft 48 and has fastened at such end a circular end plate 72 which has welded therein adjusting cap 74. An adjusting bolt 76 extends through an axial bore in the adjusting cap 74 and is secured for movement therewith by means of retaining ring 78 and jam nut 80. The threaded end of the adjusting bolt 76 is received in threaded axial bore 82 in the distal end of the drive shaft 48 whereby rotation of the adjusting bolt 76 will effect axial positioning of the hub guide 70, and thus the drum hub 64, along the shaft 48. Such construction will sufficiently secure such hub and hub guides to the shaft as well as provide for easy removal of the same. It should now be apparent that existing tire building machines may be easily retrofitted by installing the hub and hub guides on existing shafts.

Welded to each hub guide 68 and 70 are, respectively, radially extending annular guide plates 84 and 86 between which are constrained a plurality of circumferentially arranged expandable and contractable hub sectors 88. Each guide plate 84 and 86 is provided with a plurality of equally circumferentially spaced radial slots in which are press fit guide keys 90. Each guide key 90 also is received and slides in a radial slot 91 in each of the hub sectors 88 and contrains such hub sectors for radial movement. A hub sector 88 corresponds to each radial slot and key 90 in the guide plates 84 and 86 and twenty-four such hub sectors 88 and keys 90 may be provided. However, more or fewer hub sectors 88 may be employed.

The hub sectors 88 are maintained in a radially contracted state against the drum hub 64 by elastic restraining means such as the rubber garter rings or belts 96 received in annular grooves 98 in the radially outer sides of the hub sectors.

Radial expansion of the hub sectors 88 against the biasing or restraining force of the garter rings 96 may be obtained by inflation of annular bladder 100 which surrounds the drum hub 64 and which is accommodated in flared channel 102 in the inside of the hub sectors. The bladder 100 is secured to the drum hub 64 by a suitable fitting 104 through which is supplied fluid under pressure through conduit 106 in the drum hub 64 and supply line 108. The supply line 108 may be connected through rotary seal assembly 110 supported on shaft 48 to a suitable pressure source.

Expansion of the bladder 100 will effect uniform outward movement of the hub sectors 88. When the pressure in the bladder is relieved, the garter belts 96 will uniformly retract the hub sectors thereby collapsing the bladder 100.

To control precisely and accurately the expansion of the hub sectors 88, and thus the deck 56 as will be better appreciated below, annular stop rings 112 of L-shape cross-section are secured by suitable fasteners 114 through their radially inwardly extending legs 116 to the guide plates 84 and 86. The axially inwardly extending legs 118 of the rings extend inwardly beyond the guide plates in the path of the hub sectors to limit travel thereof beyond a preset or desired radius as best seen in such expanded state in FIG. 2. Such radial expansion of the hub sectors 84 may easily be adjusted by replacing the rings 112 with rings having a different stop surface I.D. as seen by the phantom position 119 in FIG. 2.

Deck 56

Still referring to FIGS. 2 and 3, the deck 56 comprises a plurality of deck segments 120 which together cooperate to define a cylindrical belt building surface. Each segment 120 is connected to a respective hub sector 88 for radial expansion and contraction of the deck by a radially extending inner deck support column or spoke 122. Each deck support column is secured to the respective hub sector by a recessed elongated cap screw 124 which extends radially the length of the deck support column and is received in a threaded bore in the hub sector. The radially inner end or base of the support column 122 includes oppositely axially extending tapered feet 126 which are received in annular grooves 128 in the hub sectors axially outwardly of the garter ring grooves 98. The inner deck support column at such radially inner end also includes circumferrentially extending symmetrical wedge 130 which receives therein a central symmetrical wedge tongue 132 which projects radially outwardly from the hub sector intermediate the garter ring grooves 98. Each tongue and slot includes a design clearance between the outer end of the tongue and the inner end of the slot so that as the fastener is tightened only the side walls of the tongue and slot support and center the column, together with, of course, the head of the fastener 124, and the feet 126. Such cooperating feet and groove and slot and tongue provide for accurate centering and rigid support for the deck support column when secured to the hub sector. To facilitate assembly, the radially outer edges of the tongue may be chamfered to provide pilot surfaces 134. As only a single fastener 124 is needed to secure each deck support column to its respective hub sector, replacement of the deck support columns with different sizes of support columns to manufacture tire components of different sizes is greatly facilitated.

It should be appreciated that the deck support columns 122 are of an "I" configuration in radial section and essentially have a profile similar to that of the "Eiffel Tower". The outwardly extending tapered feet 126 provide a broad base support and an outwardly tapered radially outer column head 138 provides sufficient and an outwardly tapered radially outer column head 138 provides sufficient support for the deck segments 120. The radially intermediate portion or stem of each deck support column through which the tension fastener extends is of reduced dimension to provide sufficient clearance for and access to the various drum components.

Referring now additionally to FIGS. 4 and 5, each deck segment 120 has secured to the head thereof a pair of outer deck sections 140 and 142 having interfitting radially inner portions 144 and 146 which are relieved at their radially outer sides, respectively, to accommodate a center desk section or clamp 152 which is secured to the head of deck support column 122 by the four fasteners 154 and which serve to clamp the outer deck sections at their coextensive inner portions to the head of deck support column 122.

The deck sections 140 and 142 include interfitting elements which are circumferentially spaced so that the deck sections can be moved axially towards and away from each other to enlarge and contract the deck axially while maintaining at least a portion thereof coextensive with the inner deck section head for clamping purposes. For example, the outer deck section 140 includes outer elongate fingers 156 and short intermediate tongue 158 while the other outer deck section 142 may include, respectively circumferentially spaced, short outer fingers 160 and elongate tongue portion 162. Such tongue portions are suitably circumferentially spaced apart from the finger portions to define when the deck sections are coextensive axially extending slots 164 to accommodate the fasteners 154 to permit such axial width adjustment such as between the positions shown in solid and phantom lines in FIGS. 4 and 5.

To ensure a positive clamping action and to prevent axial movement of the outer deck sections 140 and 142 when clamped, the interfacing surfaces of the deck sections and deck support columns 122 are suitably serrated transversely of the drum axis for mating engagement as shown at 166. By loosening or removing the fasteners 154, the outer deck sections 140 and 142 may be axially expanded or contracted as required. The fasteners 146 may then be tightened and the mating serrated surfaces of the deck sections and deck support column 120 serve to lock securely the outer deck sections in such adjusted position. Such serrations may have a pitch of approximately 0.050 inches (0.13 cm) to provide a fine incremental axial width adjustment for the drum surface. Any circumferential gap at the edges of the clamp 152 may be filled with a rubber band of the required width.

Still referring to FIGS. 4 and 5, the axial ends of each deck segment 120 are precisely formed and contoured to define together a precise peripheral deck edge for the drum. The edge of each deck segment is defined by a narrow radially extending end face 172 which forms a sharp shoulder with the adjacent deck work surface as shown at 174. Preferably, the end face extends at about a normal angle to the deck work surface at such surface. The radially inner portion of the deck end face is continuously convexly contoured or curved as shown at 178 from the sharp edge to form a gradually curving continuation off the underside 180 of the deck segment adjacent the deck edge.

For most component materials and in most situations, the gaps between the drum segments in the expanded condition can be tolerated and a precise edge fold may still be formed not showing any irregularity due to the slight gap. Depending upon the stiffness of the material being folded, it has been found that significant gaps may be tolerated. The stiffer the material the larger the gap that can be tolerated. For example, for stiffer materials, gaps of up to ¾ inch (1.9 cm) can be tolerated without showing fold irregularities. However, in some situations it may be desirable to have a continuous deck edge.

Referring now to FIGS. 6–8, the deck segments 120 adjacent their end faces 172 optionally may be circumscribed by slightly elastic gap spanning bands. The deck segments adjacent their edges are recessed at 178 to accommodate such elastic bands with the radially outer surfaces of the bands being flush with the deck surface and forming a continuation thereof. In FIG. 6, the band is seen to comprise a serpentine spring wire formed band 180 of the type shown. Preferably, the spring wire band 180 is molded in an annular hollow rubber cover 182 as shown in FIG. 7 to provide a more continuous as well as substantially rigid peripheral edge. In FIG. 8, a solid hard rubber band 184 is employed. In either case, the elastic bands provide a continuous edge spanning the gaps between adjacent deck segments when expanded which facilitate sharp and precise folding of the component belts in the below described manner.

With reference to FIGS. 9A and 9B, the deck segments 120 may also be provided with edge gap shields 186 which bridge the gap between adjacent deck segments and which provide a continuous deck edge. Each deck segment at its end face 170 has affixed, as by screws 188, the edge gap shields 186 which are in the form of thin flat strips and which slidingly overlap and engage the end face 170 of the respectively adjacent deck segment. Preferably, the edge face is recessed as at 192 the thickness of the gap shield 186 so that the same is flush with the adjacent end face. The distal end 194 of the gap shield 186 is tapered as is the corner edge 196 of the adjacent deck segment and is of such a length that when the deck is expanded, the tapered end of the gap shield will interfit with the tapered corner edge of the adjacent deck segment thus presenting a flush, continuous deck end face as seen in FIG. 9B. Upon contraction of the deck, the interfitting tapered end and corner edge will cause the gap shield at its distal end to be cammed axially outwardly and then slide along the end face of the adjacent deck segment to the position seen in FIG. 9A.

Dual Bladder Turn-Up Assemblies (60 and 62)

Reverting to FIG. 2, the other major components of the drum assembly in addition to the hub assembly 54 and center deck 56 are the dual bladder assemblies 60. Each such assembly 60 comprises adjusting brackets 204 including cylindrical sleeves 206 which ride or slide on the exterior of the hub guides 64 and 66, respectively. Welded to each sleeve are annular radial flanges 208 which have secured thereto annular plates 210 by means of fasteners 212. Such annular plates 210 are welded to the interior of cylindrical bladder support cans 216 which each support radially outer and inner annular inflatable bladders 218 and 220, respectively. When deflated as seen in FIG. 2, the outer bladder 218 lays over the inner bladder 220 and both are supported in such condition in a cylindrical fashion by the cylindrical can 216.

The inner or pusher bladder 220 may be contour molded annularly and a stem indicated at 222 may be included in the molding process. A fitting 224 is connected to the stem for inflation of the inner bladder. The stem may extend through the can 216 and may assist in locating and assembling the bladder. The outer or push-up bladder 218 also may be contour molded annularly and a stem indicated at 230 may be included in the molding process. A fitting 232 is connected to the stem for inflation of the inner bladder. The stem may extend through radially outwardly and axially inwardly stepped can extension 236. It will be appreciated that the stepped can extension is radially outwardly spaced from the can such that the thickness of the inner bladder is accommodated so that the outer bladder will lay substantially flat on the inner bladder. The outer bladder is also slightly axially inwardly centered relative to the inner bladder. Inflation of the inner and outer bladders may be accomplished by means of suitable supply lines which may be connected through rotary seal 110 to a source of pressurized fluid for controlled inflation of the bladders.

The bladder assemblies 60 which are axially slidable along the hub guides may be axially constrained by means of the adjusting assembly 240 shown at the right in FIG. 2. Although such adjusting assembly is provided for both bladder assemblies and preferably there are two such assemblies for each bladder assembly positioned diametrically opposite one another, only one such assembly is shown and described below.

Such adjusting assembly 240 comprises an adjusting screw 242 which extends through an opening in the annular flange 208 of the adjusting bracket 204 and is secured therein for free rotation by retaining ring 244, spacer 246 and jam nut 248. The adjusting screw has a threaded internal bore 250 extending the length thereof which threadedly receives threaded rod 252 which is secured at its inner end to the guide plate 82 and is fixed thereto against rotation. Accordingly, rotation of the adjusting screw will cause the same to move inwardly or outwardly along the threaded rod thus adjusting the axial position of the bladder assemblies 60.

In accordance with the invention, the bladder assemblies 60 normally will be positioned such that the outer bladder 218 is slightly radially and axially inboard of the contoured end face 172 of the deck as best seen in FIGS. 2 and 4. When so positioned, the inner bladder will preferably be positioned outwardly of the end face 172 of such deck. With the outer bladder so positioned, it has been found upon expansion of such bladder that the same will conform to the curved end face of the deck and provide a precise and sharp bend thereat with the deck edge precisely defining the belt fold line.

Operation

With reference to schematic FIGS. 10–13, the sequential steps which may be employed to form a breaker belt or other tire component having desired folded edges are shown. Initially, the operator will expand the deck 56 to its set diameter and apply the plies to the deck from a servicer. The operator will form such plies into belts and such belts may be stitched as necessary. There may be provided, for example, two such belts B1 and B2 with the outer belt B1 having an axial width substantially equal or slightly less than that of the deck. The inner belt B2 may extend axially of the drum in overhanging fashion at both sides thereof. Although only two belt plies are shown of the noted sizes, it will be appreciated that other arrangements may be provided. For example, there may be only one band or more than two bands as required for the particular tire building operation being performed. Moreover, the folded portions of the bands may be overlapped requiring first folding of one edge and then the other edge.

At this point after the belt plies have been formed on the expanded deck 56, the outer bladder 218 may be inflated. As the outer bladder is expanded, the same will tend to assume a circular shape on the centerline of its fitting. In so doing, the outer bladder will expand and walk up against the underside 180 and contoured end face 172 of the deck and fold around the deck edge carrying the overhanging ply with it to the extent possible defining a precise fold line at such drum edge as seen in FIG. 11. Subsequently or simultaneously, the inner bladder 220 may be inflated and it also would tend to come to a circular shape on the centerline of its fitting. In so doing, the inner bladder will confront the outer bladder and will tend to urge the same axially inwardly to the crescent shape shown in FIG. 12. It can be seen that the radially inner bladder is of such a shape that it will project beyond the plane of the deck thus to urge the other bladder axially inwardly to the position seen in FIG. 13. The outer bladder at this point will complete folding the edge of the inner belt B2 over the edge of the outer belt B1 to form a folded belt assembly having sharply and precisely folded edges.

After completion of the fold, the bladders may be deflated and additional operations may be done such as applying the tread to the folded breaker belt. Upon completion of the building operation, the deck may be collapsed and the tread and breaker assembly removed by transfer 26 to the shaper assembly for subsequent operations on the tire carcass.

It should be appreciated that the bladders exert substantial force against the deck segments, and if only one bladder assembly 60 is inflated, substantial axial forces are resisted by applicant's uniquely shaped deck support columns which provide the required support while permitting sufficient clearance and access to the various components.

Although the operation is principally described in connection with a two ply breaker with the opposite side edge portions of the inner breaker ply folded inwardly with the folded back widths smaller than the center widths of the breaker, other types of breaker layers may be formed. For example, larger bladders may be employed to fold the edges of an inner breaker over a width greater than half the entire width of the breaker whereby one folded over portion of the inner belt overlaps the other completely enclosing the outer belt.

Other modes of applying the principles of the invention may be employed, change being made as regards the details described, provided the features stated in any of the following claims or the equivalent of such be employed.

What is claimed is:

1. A tire building machine for folding the circumferential edge portion of a tire component, comprising: an annular deck having a cylindrical support surface for the component and a precisely formed unyielding shouldered peripheral deck edge, and an annular bladder arranged on inflation to walk along the underside of said deck adjacent said deck edge and then wrap around said deck edge to effect folding of the overhanging circumferential edge portion of the component at such deck edge independently of any inextensible element located at the fold and axially outside of such deck edge.

2. The machine of claim 1 wherein said deck edge has an end face forming a sharp shoulder with said cylindrical support surface.

3. The machine of claim 2 wherein the angle of said shoulder is approximately 90°.

4. The machine of claim 2 wherein said end face is convexly contoured from such sharp shoulder to form a gradually curving continuation of the underside of said deck, and said bladder as it expands progressively walks up said contoured end face and then wraps around said deck edge.

5. The machine of claim 1 wherein said bladder, when deflated, has its axially inner end positioned slightly radially and axially inwardly of said deck edge.

6. The machine of claim 1 wherein said deck edge has a convexly contoured end face forming a gradually curving continuation of the underside of said deck, and said bladder as it expands progressively walks up said contoured end face and then wraps around said deck edge.

7. The machine of claim 1 comprising means for urging said bladder assembly axially inwardly over said cylindrical support surface.

8. The machine of claim 7 wherein said means for urging comprises a second inflatable bladder.

9. The machine of claim 8 wherein said second bladder is mounted on a cylindrical support radially inwardly of the first mentioned bladder.

10. The machine of claim 9 wherein said deck is mounted on a rotatable shaft and said cylindrical support is mounted on said shaft for axial adjustment.

11. The machine of claim 1 wherein said deck is comprised of a plurality of segments which together define said cylindrical support surface.

12. The machine of claim 1 wherein said deck has a narrow end face about which said bladder is wrapped.

13. A tire component folding machine comprising: a cylindrical deck having a cylindrical support surface and an end face forming with said surface a rigid shouldered peripheral edge, said end face being convexly curved from said peripheral edge, first annular expandable bladder means having its axially inner end positioned slightly radially and axially inwardly of said peripheral edge and being expandable to walk up said curved end face and wrap around said peripheral edge, and second annular expandable bladder means positioned radially inwardly of said first bladder means and so arranged when inflated to urge said first bladder means axially inwardly.

14. The machine of claim 13 wherein said first expandable bladder means when inflated is restrained by said peripheral edge to cause said first bladder means to wrap around said peripheral edge.

15. The machine of claim 14 wherein said deck is radially expandable and collapsible.

16. The machine of claim 13 wherein said deck has a narrow end face and said end face forms a sharp shoulder on said deck about which said first bladder is folded.

17. A belt folding drum for folding an endless belt or tire component comprising: a cylindrical center deck having unyielding axial edges defining fold lines for the belt overhanging said edges, and a radially inner and outer bladder at each axial end of said deck, each radially outer bladder being operable on inflation to purchase to said deck adjacent said deck edge and the overhanging belt to said bladder as it walks around said deck edge flatly to fold the belt along the fold line independently of any inextensible element located at such fold line and axially outside of said deck.

18. The drum of claim 17 comprising means for radially expanding and contracting said deck.

19. The drum of claim 18 comprising means for moving said bladders axially inwardly and outwardly relative to said center deck.

20. The drum of claim 17 including means to expand and contract said drum, and means operative to form a continuous edge on said deck upon expansion.

21. The drum of claim 20 wherein each deck segment comprises a radially extending end face and gap shield secured to each said deck segment at said end face to span the gaps between said deck segments and their next adjacent deck segments when expanded, and slidingly to engage said end faces of said next adjacent deck segments.

22. The drum of claim 21 wherein said end faces are recessed to mount said gap shields flush with the end face when the drum is expanded.

23. The drum of claim 20 comprising an elastic gap spanning band circumscribing said center deck at each axial end thereof.

24. A belt folding drum for folding endless belts of tire components comprising a cylindrical centered deck having unyielding axial edge means for defining fold lines for the belts, radially inner and outer bladder means at each axial end of said deck, each radially outer bladder means having a portion thereof located radially and axially inwardly of the respective adjacent axial edge means of said deck for cooperating when inflated with said edge mean to fold flatly the belts along such fold lines independently of any inextensible element located at such fold lines and axially outside of said deck, means to expand and contract said drum, and means operative to form a continuous edge on said deck upon expansion, said last mentioned means including an elastic gap spanning band circumscribing said center deck at each axial end thereof, and said band including a serpentine metal spring.

25. The drum of claim 24 wherein said serpentine metal spring is encased in an annular rubber hollow cover.

26. A belt folding drum for folding endless belts of tire components comprising a cylindrical center deck having unyielding axial edge means for defining fold lines for the belts, radially inner and outer bladder means at each axial end of said deck, each radially outer bladder means having a portion thereof located radially and axially inwardly of the respective adjacent axial edge means of said deck for cooperating when inflated with said edge means to fold flatly the belts along such fold lines independently of any inextensible element located at such fold lines and axially outside of said deck, means to expand and contract said drum, and means operative to form a continuous edge on said deck upon expansion, said last mentioned means including an elastic gap spanning band circumscribing said center deck at each axial end thereof, and said band including a solid rubber band.

27. A belt folding drum for folding endless belts of tire components comprising a cylindrical center deck having unyielding axial edge means for defining fold lines for the belts, radially inner and outer bladder means at each axial end of said deck, each radially outer bladder means having a portion thereof located radially and axially inwardly of the respective adjacent axial edge means of said deck for cooperating when inflated with said edge means to fold flatly the belts along said fold lines independently of any inextensible element located at such fold lines and axially outside of said deck, means to expand and contract said drum, and means operative to form a continuous edge on said deck upon expansion, said last mentioned means including an elastic gap spanning band circumscribing said center deck at each axial end thereof, and said center deck at said axial ends being recessed to receive said elastic gap spanning band with a flush fit.

28. A tire building apparatus including a segmented drum for building a tire or tire component, said drum comprising a plurality of deck segments cooperable to define a cylindrical building surface, a radially inner deck support for each segment, each segment including a pair of outer deck sections adjustable toward and away from each other to expand and contract said deck axially, each deck section having an axially outer portion defining said building surface and a radially inner portion interfitting with the inner portion of the other as the same are adjusted axially with respect to each other, and clamping means coextensive with said inner portions of said pair of outer deck sections for securing the latter to said deck support.

29. The apparatus of claim 28 wherein said clamping means comprises a center deck section, and fastening means for securing said center deck section to said deck support.

30. The apparatus of claim 29 wherein said center deck section cooperates with said outer deck sections to define said building surface.

31. The apparatus of claim 30 wherein said outer deck sections are recessed at the center of the drum to accommodate said center deck section.

32. The apparatus of claim 31 wherein said outer deck sections and deck support are joined at interfacing, axially extending, serrated surfaces.

33. The apparatus of claim 32 wherein said interfacing axially extending surfaces are serrated transversely to the deck axis, the serrations in each surface being uniform and of a common pitch.

34. The apparatus of claim 33 wherein said inner portions have interfitting elements and said interfitting elements are circumferentially offset to accomodate said fastening means.

35. A tire building drum comprising a plurality of expandable segments, each segment including an inner portion and three outer portions, the latter forming the working deck, the outer portions including a center portion and two edge portions on each side thereof, the edge portions extending partially beneath the center portion and being adjustable axially therebeneath to adjust the edge-to-edge width of the deck and the center portion adjustably clamping the edge portions to the inner portion.

36. A tire building drum as set forth in claim 35 wherein the edge portions and inner portion are joined by interfacing serrated surfaces, such serrations extending transversely to the drum axis.

37. A tire building drum as set forth in claim 36 wherein the serrations are uniform and of a common pitch.

38. A tire building drum as set forth in claim 35 including clamp fasteners extending from the center portion to the inner portion.

39. A tire building drum as set forth in claim 38 wherein said edge portions beneath the center portion interfit with each other and include clearances for said clamp fasteners.

40. A tire building drum as set forth in claim 35 wherein said inner portion has the general configuration of an I in radial section to provide clearance axially within and circumferentially subjacent the deck edges.

41. A method for folding a tire component comprising the steps of:
(a) arranging the component around a cylindrical deck having a relatively rigid peripheral edge with a cylindrical edge portion of the component extending axially outwardly beyond such peripheral edge of the deck, and then
(b) expanding an annular bladder to cause the same to walk along the underside of the deck adjacent such peripheral edge thereof and then wrap around such peripheral edge to effect folding of the component edge portion along a fold line defined by such peripheral edge of the deck independently of any inextensible element located at such fold line and axially outside of the deck.

42. The method of claim 41 wherein said peripheral edge has an end face forming a sharp shoulder with said cylindrical support surface.

43. The method of claim 42 wherein said end face is convexly contoured from such sharp shoulder to form a gradually curving continuation of the underside of said deck, and said bladder as it expands progressively walks up said contoured end face and then wraps around said peripheral edge.

44. The method of claim 41 comprising the step of locating the annular bladder partially radially underlying the deck adjacent such peripheral edge thereof before expanding the same to effect folding of the component.

45. The method of claim 44 including causing the bladder to move axially inwardly to fold the cylindrical edge portion of the component axially inwardly along such fold line to overlie the adjacent circumferential portion of the component.

46. The method of claim 45 comprising the step of locating a second bladder radially inwardly of the first bladder and expanding the second bladder to effect axial movement of the first bladder.

47. The method of claim 46 comprising the step of adjusting the axial width of the deck and the axial position of the first and second bladders relative to the adjusted deck edge to accomodate different sizes of tire components.

48. The method of claim 47 comprising the step of radially expanding and contracting the deck to facilitate removal of the folded tire component therefrom.

49. The method of claim 41 wherein said peripheral edge has a convexly contoured end face forming a gradually curving continuation of the underside of said deck, and said bladder as it expands progressively walks up said contoured end face and then wraps around said peripheral edge.

50. A tire building drum comprising a rotatable hub, a plurality of hub segments secured to said hub for rotation therewith and mounted thereon for radial expansion and contraction, and removable spokes having the general configuration of an I in radial section secured to said hub segments and supporting deck segments forming the working surface of the drum, the feet of the I providing a broad base support therefor and the head providing support for the deck segments.

51. A drum as set forth in claim 50 including a wedge tongue and slot connection between said spokes and segments.

52. A drum as set forth in claim 51 including a design clearance between the tip of the tongue and bottom of the slot.

53. A drum as set forth in claim 52 including a single elongated fastener for each spoke extending through the stem of the eye and into the tongue and slot connection.

54. A drum as set forth in claim 53 wherein said fastener is headed with the head bearing on the outer end of the stem with the other end being threaded into the respective hub segment.

55. A tire reinforcement component folding machine having a segmented cylindrical drum which when expanded forms a cylindrical work surface of uniform width with gaps between adjacent segments not exceeding three-quarter-inch (1.9 centimeters), and dual bladder assembly means subjacent each edge of said drum for cooperating therewith for folding such component at the respective edge flatly along a fold line defined by such cooperation of said bladder assembly means and respective edge, such folding being effected independently of any inextensible element located at the fold line and axially outside of the respective drum edge.

56. A method for folding a tire component comprising the steps of:
(a) arranging the component around a cylindrical deck having a relatively rigid peripheral edge with a cylindrical edge portion of the component extending axially outwardly beyond such peripheral edge of the deck,
(b) locating an annular inflatable bladder partially radially underlying the deck adjacent such peripheral edge thereof, and
(c) expanding the bladder to fold the cylindrical edge portion of the component along a fold line defined by such peripheral edge of the deck, and causing the bladder to move axially inwardly to fold the cylindrical edge portion of the component axially inwardly along such fold line to overlie the adjacent circumferential portion of the component, the bladder when expanding walking up the underside of the deck adjacent such peripheral edge thereof and around such peripheral edge to effect folding of the component edge portion independently of any inextensible element located at the fold and axially outside of such peripheral edge.

57. The method of claim 56 comprising the step of locating a second bladder radially inwardly of the first bladder and expanding the second bladder to effect axial inward movement of the first bladder.

58. The method of claim 57 comprising the step of adjusting the axial width of the deck and the axial position of the first and second bladders relative to the adjusted deck edge to accommodate different sizes of tire components.

59. The method of claim 58 comprising the step of radially expanding and contracting the deck to facilitate removal of the folded tire component therefrom.

60. The method of claim 56 wherein said peripheral edge is sharply shouldered.

* * * * *